United States Patent

Vazirani

[11] 4,099,837
[45] Jul. 11, 1978

[54] COATING OF FIBER LIGHTGUIDES WITH UV CURED POLYMERIZATION PRODUCTS

[75] Inventor: Hargovind Nihchaldas Vazirani, Stirling, N.J.

[73] Assignee: Bell Telephone Laboratories, Incorporated, Murray Hill, N.J.

[21] Appl. No.: 690,158

[22] Filed: May 26, 1976

[51] Int. Cl.² .............................................. G02B 5/14
[52] U.S. Cl. .................................. 350/96.29; 427/54; 427/162
[58] Field of Search ............. 350/96 WG, 96 B, 96 R, 350/96 M; 427/54, 162, 169; 204/159.19

[56] References Cited

U.S. PATENT DOCUMENTS

| | | |
|---|---|---|
| 3,673,140 | 6/1972 | Ackerman et al. ......... 204/159.19 X |
| 3,876,432 | 4/1975 | Carlick et al. ............. 204/159.19 X |
| 3,980,390 | 9/1976 | Yamamoto et al. ........... 350/96 WG |

FOREIGN PATENT DOCUMENTS 2,233,637  1/1975  France .............................. 350/96 M Primary Examiner—John K. Corbin
Assistant Examiner—Rolf Hille
Attorney, Agent, or Firm—Peter V. D. Wilde

[57] ABSTRACT

Glass fiber lightguides require polymer coatings for protection. A new coating system comprising an acrylate-epoxy polymer that is UV cured is convenient to apply and gives excellent strength and durability to fiber lightguides.

4 Claims, 1 Drawing Figure

U.S. Patent July 11, 1978 4,099,837
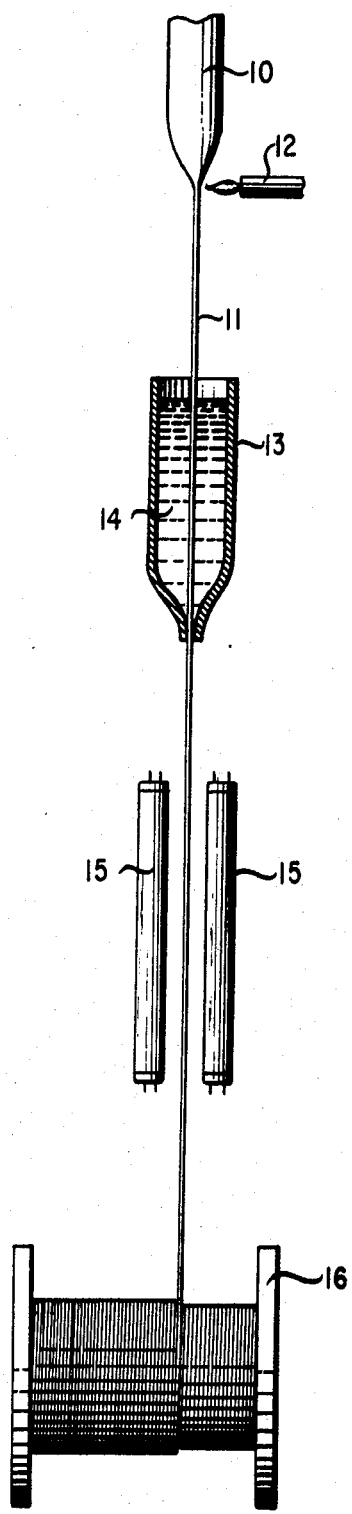

COATING OF FIBER LIGHTGUIDES WITH UV CURED POLYMERIZATION PRODUCTS

BACKGROUND OF THE INVENTION

It is well known that glass fibers have exceptional tensile strength. It is also well known that long lengths of pristine fibers rarely possess the tensile strength of short glass fibers. This is because the surface of glass is fragile and susceptible to scratches and contaminants that produce breaks. The number of potential break sites increases with the length of the fiber so the tensile strength is length dependent. (The actual relationship is non-trivial. There is some evidence that the dependence is bimodal).

It has been recognized widely that the strength of a long fiber can be improved by protecting the fiber from surface contaminants and physical abuse. Abuse in this context has been found to mean any physical contact— such is the fragility of the unprotected surface. It is therefore standard in the art to apply a protective plastic coating to the fiber as it is formed. Considerable effort has been expended in the technology of coating long fibers. Such fibers are of interest mainly for the transmission of intelligent information via light signals, and are referred to as optical fibers.

SUMMARY OF THE INVENTION

This invention is a new coating system for fiber lightguides. It is a UV cured epoxy-acrylate coating which through considerable development effort has been found to impart high strength to pristine fibers and can be applied by simple and effective coating procedures.

BRIEF DESCRIPTION OF THE DRAWING

The FIGURE is a schematic arrangement of an apparatus arranged for applying to an optical fiber a coating according to the invention.

DETAILED DESCRIPTION

The FIGURE shows a preform 10 being drawn into an endless glass fiber 11 with the aid of a heat source 12 applied in a conventional way. A coating vessel 13 is arranged to coat the fiber with a fluid 14 which later, upon curing, becomes the protective coating for the fiber. The coating vessel is shown here as a simple cup with a flooded exit capillary, through which the fiber is threaded. A more detailed account of a suitable coating apparatus appears in U.S. patent application, Ser. No. 600,280, filed July 31, 1975, by R. V. Albarino and S. Torza, now U.S. Pat. No. 4,073,974. The fiber exiting from the coating vessel and carrying uncured resin, passes through the curing stage, which is shown here as one or more UV lamps 15 arranged with UV light incident efficiently on the fiber. The finished fiber, now coated with a cured resin, is taken up on conventional reel 16.

The material contained in the coating vessel is, according to the invention, a prepolymer made by mixing certain epoxy resins and reacting the mixture with acrylic and/or methacrylic acid. The mixture contains an aliphatic type glycidyl ether and an aromatic type glycidyl ether. Excellent results have been obtained with a mixture of 1, 4-butanediol diglycidyl ether and a diglycidyl ether of bisphenol A or substituted, e.g., halogenated, bisphenol A, and specifically with brominated bisphenol A. The recommended proportion of aliphatic diglycidyl ether to aromatic diglycidyl ether is 0.4 to 1.0 on a weight ratio basis.

The epoxy resin mixture is reacted with acrylic and/or methacrylic acid on an equivalent basis with between 0.5 to 1.0 mol acid per epoxy equivalent weight, and preferably 0.8–0.95 mol acid per equivalent weight. Either acrylic acid or methacrylic acid function adequately and can be mixed in any proportion to give the recommended molar quantity.

The reaction to form the prepolymer proceeds more effectively in the presence of a tertiary amine. The amine functions as a catalyst to the epoxy-acrylic acid addition reaction. In quantity, 0.05 percent to 1 percent amine by weight of the total mix is adequate. Diethylaminoethanol has been found useful for this purpose.

A particularly useful ingredient of the prepolymer mixture is a UV sensitizer which promotes the efficiency with which the polymer is cured during the fiber coating operation. UV sensitizers, which are basically UV absorbers, are conventional in the art. Good results have been obtained with benzoin and its methyl isobutyl ethers. The sensitizer is typically added in an amount in the range of 0.1 percent to 5 percent by weight of the total prepolymer mix and preferably in the range of 0.5 percent to 1.0 percent.

Also found beneficial in conventional coating compositions for glass fibers are coupling agents that prevent adsorption of water at the glass surface. It is known that water is hostile to glass fibers and reduces fiber strength. Coupling agents that improve the wet strength of fibers are stable in the presence of moisture and chemisorb to the silanol groups on the glass surface which otherwise tend to hydrolize with water and impair the strength of the fiber. The most effective coupling agents for fiber coating also have unsaturated sites that attach to the polymer and improve the bond between the polymer coating and the glass surface. Coupling agents that have been proposed for optical fiber coatings are typically silanes and titanates.

Various coupling agents have been used in amounts of 0.1 percent to 5 percent by weight, and preferably 0.5 percent to 1.0 percent, in the coating compositions of this invention. However, it has been demonstrated that the particular UV cured epoxy-acrylate system of this invention functions adequately without a coupling agent. It appears that the integrity of the coating and the resistance to moisture contamination is of the same order with or without the coupling agents tested. It may be that significant differences with particular coupling compounds in certain formulations exist as compared with the same formulations without coupling agents, but clear evidence points to the advantage of this system in not always requiring the addition of coupling agents. It can be theorized that the epoxy-acrylate molecule serves itself the function of a coupling agent. The structure of the coating compounds includes hydroxyl groups that are available for coupling with the silanol groups on the glass. The molecule also contains an unsaturated tail, in the acrylate group, for bonding to the polymer coating.

It may also be desirable in some cases to add to the prepolymer mix a thermal inhibitor such as hydroquinone, or a substituted hydroquinone, e.g., the methyl ether of hydroquinone. Amounts of the order of 0.1–0.5 parts per hundred resin are effective.

The foregoing components are mixed and reacted at a temperature in the range of 100° to 170° C to form the prepolymer. In the event the prepolymer is to be stored prior to use, the shelf life can be extended by the addition to the prepolymer mix of a stabilizer such as 4-tertiary butyl catechol in an amount of 0.01 to 0.5 percent by weight of the resin.

SPECIFIC EMBODIMENT OF THE INVENTION

The following ingredients were mixed to proportions indicated to give a prepolymer:

|  | Approximate Weight Percent |
| --- | --- |
| 1,4-butanediol diglycidyl ether | 28 |
| brominated bisphenol A | 46 |
| acrylic acid | 26 |

An addition reaction catalyst, 0.2 parts per hundred resin of diethylaminoethanol, and an equal amount of hydroquinone as a stabilizer were also added. These ingredients are regarded as preferred but not essential.

This prepolymer mix was reacted at 140° C with stirring for approximately 1-2 hours or until an acid value of 1.5 ± 0.5 was obtained.

The prepolymer contains approximately 75 percent of the following species:

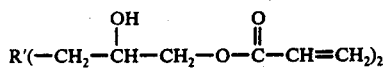

and

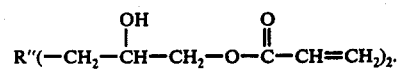

The remaining 25 percent consists of:

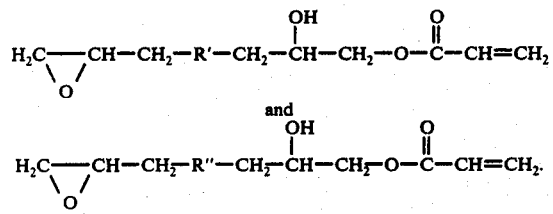

Where R' is an aromatic glycidyl ether group and R" is an aliphatic glycidyl ether group. In this particular embodiment,

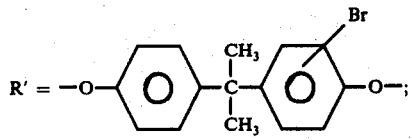

and R" = —O—(CH$_2$)$_4$—O—.

The prepolymer mix included also 0.5 parts by weight to 100 parts of prepolymer of VICURE 10, a benzoin type sensitizer obtained from the Stauffer Chemical Corporation, and 1 part per 100 parts prepolymer of Z-6032, a silane coupling agent made by Dow Corning Corporation. As indicated above the silane coupling agent is considered to be optional.

Optical fibers were drawn vertically by a conventional drawing technique and passed through a coating applicator of the kind described in the aforementioned application. The applicator contained the prepolymer mix just described. The exit port of the applicator was varied to yield coatings ranging in thickness from 25 to 100 micrometers. The coatings on the fiber were cured at a speed of 25 meters per minute by passing the prepolymer coated fiber between two water-cooled or air-cooled, 12 inches 200 watt/in medium pressure mercury UV lamps. Faster drawing and curing speeds can be obtained by using longer lamps or gangs of lamps or by increasing the amount of UV sensitizer in the prepolymer. The coated fibers were taken up on a standard 11' aluminum drum. The glass fiber after coating exhibited a tensile strength of 1,010 psi for short lengths.

The physical properties of the polymer coating are as follows:

Young's Modulus —~6,000 psi
Elongation at Break —~20%

The cured polymer forming the coating is a highly crosslinked material which does not fuse, even at temperatures as high as 325° C. The material when exposed to such high temperatures for reasonably short time periods remains quite flexible.

Curing of the polymer system of the invention can be enhanced thermally, or the polymer can be completely cured thermally. In the latter case the addition of peroxides or other thermally sensitive oxidants will aid the curing process.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. An optical fiber waveguide comprising a glass fiber and a polymer coating the fiber, the invention characterized in that the polymer coating comprises the polymerization product of a prepolymer mixture resulting from reacting acrylic acid with a 0.4 to 1.0 weight ratio mixture of aliphatic diglycidyl ether to aromatic diglycidyl ether, and further characterized in that the polymerization product contains a UV sensitizer in order to cure said prepolymer mixture with ultra violet light. light.

2. The waveguide of claim 1 in which the aliphatic ether is 1,4-butanediol diglycidyl ether.

3. The waveguide of claim 2 in which the aromatic ether is diglycidyl ether of halogenated bisphenol A.

4. The waveguide of claim 1 in which the polymerization product additionally contains a silane or titanate coupling agent.

* * * * *